(12) United States Patent
Dharmarajan et al.

(10) Patent No.: US 8,101,534 B2
(45) Date of Patent: Jan. 24, 2012

(54) FIBERS AND NON-WOVENS PREPARED WITH PROPYLENE-BASED ELASTOMERS

(75) Inventors: Narayanaswami Raja Dharmarajan, Houston, TX (US); Vincent B. Gallez, Ottignies Louvain-La-Neuve (BE); Smita Kacker, Houston, TX (US); Chia Yung Cheng, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 710 days.

(21) Appl. No.: 11/938,030

(22) Filed: Nov. 9, 2007

(65) Prior Publication Data
US 2009/0124153 A1 May 14, 2009

(51) Int. Cl.
*D04H 3/00* (2006.01)
(52) U.S. Cl. ......... 442/327; 442/328; 442/329; 525/240
(58) Field of Classification Search ................. 442/329, 442/327, 328; 525/240
See application file for complete search history.

(56) References Cited

U.S. PATENT DOCUMENTS

| | | | |
|---|---|---|---|
| 6,218,010 | B1 | 4/2001 | Georgellis et al. |
| 6,342,565 | B1 | 1/2002 | Cheng et al. |
| 6,635,715 | B1 | 10/2003 | Datta et al. |
| 2005/0043489 | A1 | 2/2005 | Datta et al. |
| 2005/0107529 | A1 | 5/2005 | Datta et al. |
| 2005/0130544 | A1 | 6/2005 | Cheng et al. |
| 2005/0170727 | A1 | 8/2005 | Melik et al. |
| 2005/0182198 | A1* | 8/2005 | Cheng et al. ................. 525/240 |

FOREIGN PATENT DOCUMENTS

EP   0 400 238   12/1990

OTHER PUBLICATIONS

U.S. Appl. No. 11/937,552, filed Nov. 9, 2007 entitled "Fibers and Non-Wovens Prepared with Propylene-Based Elastomers", Inventors: Bruce A. Harrington et al.
U.S. Appl. No. 11/698,359, filed Jan. 26, 2007 entitled "Fibers and Non-Wovens Prepared with Propylene-Based Elastomers".
U.S. Appl. No. 11/655,399, filed Jan. 19, 2007 entitled "Spunbond Fibers and Fabrics From Polyolefin Blends".
U.S. Appl. No. 11/698,630, filed Jan. 26, 2007 entitled "Elastomeric Non-Wovens".
Equistar Technical Tip, tech.topic, "Polyolefin Flow Characteristics: More than Just Melt Index or Melt Flow Rate," Equistar, Lyondell Chemical Company, Houston, Texas, pp. 1-3. http://www.lyondellbasell.com/techlit/techlit/Tech%20Topics/General/Flow%20Characteristics.pdf.

* cited by examiner

*Primary Examiner* — Peter Y Choi
(74) *Attorney, Agent, or Firm* — Kevin M. Faulkner

(57) ABSTRACT

A non-woven fabric made from a composition prepared by combining a first propylene-based polymer blend, where the first polymer blend is prepared by combining a propylene-based elastomer with a propylene-based thermoplastic resin and where the first blend has an MFR (ASTM D-1238 2.16 kg @ 230° C.) equal to or less than 50 dg/min, with a second propylene-based polymer blend, where the second polymer blend is prepared by combining a propylene-based elastomer with a propylene-based thermoplastic resin and where said second blend has an MFR (ASTM D-1238 2.16 kg @ 230° C.) greater than 50 dg/min, where the propylene-based elastomers comprise from about 5% to 35% by weight units derived from ethylene or non-propylene alpha-olefin and have a heat of fusion, as determined by DSC, of less than 80 J/g, and where the propylene-based thermoplastic resins have a heat of fusion, as determined by DSC, equal to or greater than 80 J/g.

8 Claims, No Drawings

FIBERS AND NON-WOVENS PREPARED WITH PROPYLENE-BASED ELASTOMERS

FIELD OF THE INVENTION

Embodiments of this invention are directed toward fibers and non-wovens prepared from compositions including propylene-based elastomers and propylene-based thermoplastics, where the compositions have a bimodal molecular weight distribution.

BACKGROUND OF THE INVENTION

Propylene-based elastomers, which may also be referred to as semi-amorphous propylene copolymers or crystallizable propylene-based copolymers, have been employed in the manufacture of fibers and non-woven fabrics. These copolymers are often blended with other polymers in the pursuit of desirable properties.

For example, U.S. Publication No. 2005/0107529 teaches fibers prepared from propylene-based elastomers. Examples 1-4 teach the production of fibers from a melt that contains a 20 MFR propylene-ethylene copolymer containing 15 weight percent ethylene together with a propylene homopolymer. The propylene homopolymer is either a 36 MFR homopolymer or a 400 MFR homopolymer. The fibers are formed by employing a conventional fiber spinning line under partially oriented yarn mode. The fibers and non-wovens prepared therefrom can be heat set to provide durable fabrics.

U.S. Pat. No. 6,218,010 teaches an ethylene-propylene copolymer alloy which is suited for making fibers and non-woven spunbond fabrics having softness at economically acceptable processing conditions. The alloy comprises a random copolymer having an ethylene content of from about 1 to about 5% by weight in an amount of from about 40 to about 90% by weight of the alloy; and a second ethylene-propylene copolymer having an ethylene content of from about 5 to about 40% by weight, in an amount of from about 10 to about 60% by weight of the alloy. The copolymer alloys are described to be prepared by a multi-reactor process comprising a first stage of polymerizing a mixture of ethylene and propylene in single or plural reactors, in the presence of a catalyst system capable of randomly incorporating the ethylene monomers and/or alpha-olefin into the macromolecules to form the random copolymer, and a second stage of, in the further presence of the random copolymer containing active catalyst, polymerizing a mixture of ethylene and propylene in single stage or in plural stages to form the second ethylene-propylene copolymer.

U.S. Pat. No. 6,342,565 teaches soft elastic fiber compositions that include a crystallizable propylene copolymer and a crystalline propylene copolymer such as isotactic polypropylene. The fibers may also include a second crystallizable propylene copolymer. The first crystallizable propylene copolymer is characterized by a melting point of less than a 105° C. and a heat of fusion of less than 45 J/g. The crystalline propylene copolymer may be characterized by a melting point above 110° C. and a heat of fusion greater than 60 J/g. Where a second crystallizable propylene copolymer is employed, it may differ from the first crystallizable propylene copolymer in molecular weight and/or crystallinity content.

U.S. Pat. No. 6,635,715 describes blends of a first isotactic polypropylene homopolymer or copolymer component with a second alpha-olefin and propylene copolymer component, wherein the first isotactic polypropylene component has a melting point above about 110° C., and the second copolymer has a melting point between about 25° C. and 105° C. The blends may have from 2 to 95 wt % of the first component and from 98 to 5 wt % of the second copolymer component. In the examples, the polypropylene used is Escorene® 4292, an isotactic polypropylene homopolymer having a nominal melt flow rate (MFR) of 2.0 g/10 min, and the second copolymer is illustrated by an Mw (weight-average molecular weight) of 248,900 to 318,900 and by a Mooney viscosity (ML (1+4) at 125° C. according to ASTM D1646) of from 12.1 to 38.4. The blends are directed to improved mechanical properties of processing, increased tensile strength, elongation, and overall toughness.

SUMMARY OF THE INVENTION

In one or more embodiments, the present invention provides a non-woven fabric made from a composition prepared by introducing a first propylene-based polymer blend prepared by combining a propylene-based elastomer with a propylene-based thermoplastic resin, where the first blend is characterized by an MFR (ASTM D-1238 2.16 kg @ 230° C.) equal to or less than 50 dg/min, with a second propylene-based polymer blend prepared by combining a propylene-based elastomer with a propylene-based thermoplastic resin, where the second blend is characterized by an MFR (ASTM D-1238 2.16 kg @ 230° C.) greater than 50 dg/min. The propylene-based elastomers comprise from about 5% to 35% by weight units derived from ethylene or non-propylene alpha-olefin and have a heat of fusion, as determined by DSC, of less than 80 J/g, and the propylene-based thermoplastic polymers have a heat of fusion, as determined by DSC, equal to or greater than 80 J/g.

In other embodiments, the present invention provides a non-woven fabric made from a composition prepared by introducing at least three of the following: a propylene-based elastomer having an MFR (ASTM D-1238 2.16 kg @ 230° C.) greater than 50; a propylene-based elastomer having an MFR (ASTM D-1238 2.16 kg @ 230° C.) equal to or less than 50; a propylene-based thermoplastic polymer having an MFR (ASTM D-1238 2.16 kg @ 230° C.) equal to or less than 20; and a propylene-based thermoplastic polymer having an MFR (ASTM D-1238 2.16 kg @ 230° C.) greater than 20. In these embodiments, the propylene-based elastomers may comprise from about 5% to about 35% by weight units derived from ethylene or non-propylene alpha-olefin and have a heat of fusion, as determined by DSC, of less than 80 J/g. Further, the propylene-based thermoplastic polymers may have a heat of fusion, as determined by DSC, equal to or greater than 80 J/g.

In other embodiments, the present invention provides a method for preparing a non-woven fabric. In such embodiments, the method comprises fabricating a non-woven fabric from a composition prepared by combining a first propylene-based polymer blend, which is prepared by combining a propylene-based elastomer with a propylene-based thermoplastic resin, where the first blend has an MFR (ASTM D-1238 2.16 kg @ 230° C.) equal to or less than 50, with a second propylene-based polymer blend, which is prepared by combining a propylene-based elastomer with a propylene-based thermoplastic resin, where the second blend has an MFR (ASTM D-1238 2.16 kg @ 230° C.) greater than 50. The propylene-based elastomers comprise from about 5% to 35% by weight units derived from ethylene or non-propylene alpha-olefin and have a heat of fusion, as determined by DSC, of less than 80 J/g, and the propylene-based thermoplastic polymers have a heat of fusion, as determined by DSC, equal to or greater than 80 J/g.

In other embodiments, the present invention provides a non-woven fabric made from a composition comprising a propylene-based elastomer and a propylene-based thermoplastic polymer, where the propylene-based elastomer comprises from about 5% to about 35% by weight units derived from ethylene or non-propylene alpha-olefin and have a heat of fusion, as determined by DSC, of less than 80 J/g. The propylene-based thermoplastic polymer has a heat of fusion, as determined by DSC, equal to or greater than 80 J/g, and at least one of the propylene-based elastomer and the propylene-based thermoplastic polymer exhibits a bimodal molecular weight distribution.

DETAILED DESCRIPTION OF ILLUSTRATIVE EMBODIMENTS

According to one or more embodiments of the present invention, fibers and/or non-woven fabrics are prepared from compositions that include propylene-based thermoplastic resins and propylene-based elastomers, where at least one of the propylene-based thermoplastic resins and/or the propylene-based elastomers have a bimodal molecular weight distribution. In particular embodiments, the fibers and non-woven fabrics are prepared by employing spunbonding techniques. The fibers and non-woven fabrics can be used in composite constructions.

In one or more embodiments, the composition may be prepared by combining a first propylene-based polymer blend having an MFR equal to or less than 50 dg/min with a second propylene-based polymer blend having an MFR greater than 50 dg/min, where the first and second propylene-based polymer blends include a propylene-based elastomer and a propylene-based thermoplastic. The MFR of the second blend may be increased to greater than 50 dg/min by vis breaking.

In other embodiments, the composition may be prepared by combining at least three of the following: (a) a propylene-based elastomer having an MFR greater than 50 dg/min; (b) a propylene-based elastomer having an MFR equal to or less than 50 dg/min; (c) a propylene-based thermoplastic polymer having an MFR equal to or less than 20 dg/min; or (d) a propylene-based thermoplastic polymer having an MFR greater than 20 dg/min.

Propylene-Based Elastomer

In one or more embodiments, propylene-based elastomers, which may also be referred to as a propylene-based copolymers, include units (i.e., mer units) derived from propylene, one or more comonomer units derived from ethylene or α-olefins including from 4 to about 20 carbon atoms, and optionally one or more comonomer units derived from dienes. In one or more embodiments, the α-olefin comonomer units may derive from ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other propylene-based copolymers with other α-olefin comonomers. As used herein, the term "copolymer" is meant to include any polymer comprising two or more monomers. Further, the term "resin" is used interchangeably with the term "copolymer".

In one or more embodiments, the propylene-based elastomers may comprise at least 5 wt %, in other embodiments at least 7 wt %, in other embodiments at least 8 wt %, in other embodiments at least 9 wt %, and in other embodiments at least 10 wt % ethylene-derived units; in these or other embodiments, the copolymers may comprise up to 35 wt %, in other embodiments up to 30 wt %, in other embodiments up to 25 wt %, in other embodiments up to 22 wt %, in other embodiments up to 20 wt %, and in other embodiments up to 18 wt % ethylene-derived units, where the percentage by weight is based upon the total weight of the propylene-derived and α-olefin derived units. In these or other embodiments, the propylene-based elastomers may include at least 65 wt %, 70 wt %, or 75 wt %, or in other embodiments at least 78 wt %, propylene-derived units; and in these or other embodiments, the copolymers may include up to 80 wt %, in other embodiments up to 82 wt %, in other embodiments up to 90 wt %, and in other embodiments up to 93 wt %, and in other embodiments up to 95 wt % propylene-derived units, where the percentage by weight is based upon the total weight of the propylene-derived and α-olefin derived units. The propylene-based elastomer may have diene derived mer units in an amount from about 0.5 wt % up to 5 wt % of the total polymer.

The ethylene content can be measured as follows for a copolymer having an ethylene content up to 40 wt % ethylene. A thin homogeneous film is pressed according to sub-method A of ASTM D-3900. It is then mounted on a Perkin Elmer Spectrum 2000 infrared spectrophotometer. A full spectrum is recorded using the following parameters: Resolution: 4.0 $cm^{-1}$, Spectral Range: 4500 to 450 $cm^{-1}$. Ethylene content is determined by taking the ratio of the propylene band area at 1155 $cm^{-1}$ to the ethylene band area at 732 $cm^{-1}$ ($C_3/C_2$=AR) and applying it to the following equation: Wt % Ethylene=$73.492-89.298X+15.637X^2$, where X=AR/(AR+1) and AR is the peak area ratio (1155 $cm^{-1}$/722 $cm^{-1}$).

The propylene-based elastomers of one or more embodiments are characterized by having a broad melting transition as determined by differential scanning calorimetry (DSC) with one or more maxima points. The melting point ($T_m$) discussed here refers to the highest temperature at which a maxima of heat absorption within the range of melting of the sample occurs.

In one or more embodiments, the $T_m$ of the propylene-based elastomer (as determined by DSC) is less than 120° C., in other embodiments less than 105° C., in other embodiments less than 75° C., and in other embodiments less than 60° C.

In one or more embodiments, the propylene-based elastomer may be characterized by a heat of fusion ($H_f$) determined by DSC. In one or more embodiments, the propylene-based elastomer may have an $H_f$ that is at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, the propylene-based elastomer may have an $H_f$ of less than 80 J/g, in other embodiments less than 75 J/g, in other embodiments less than 65 J/g, in other embodiments less than 55 J/g, in other embodiments less than 50 J/g, in other embodiments less than 45 J/g, and in other embodiments from about 30 to about 50 J/g. Crystallinity may be determined by dividing the heat of fusion of a sample by the heat of fusion of a 100% crystalline polymer, which is assumed to be 189 J/g for isotactic polypropylene.

As used within this specification, DSC procedures for determining $T_m$ and $H_f$ are as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a Differential Scanning Calorimeter (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the $H_f$ of the polymer. The $T_m$ discussed here refers to the highest temperature at which a maxima in heat absorption within the range of melting of the sample occurs with respect to a baseline assigned by the calorimeter. This might also be typically the temperature of the greatest heat absorption within the range of melting of the sample.

The propylene-based elastomer can have a triad tacticity of three propylene units, as measured by $^{13}C$ NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042.

In one or more embodiments, the propylene-based elastomer has a narrow compositional distribution (CD). This intermolecular composition distribution of the copolymer can be determined by thermal fractionation in a solvent, such as hexane or heptane, as follows. Approximately 75% by weight (more preferably 85% by weight) of the polymer is isolated as one or two adjacent soluble fractions with the balance of the copolymer in immediately preceding or succeeding fractions. In order for the copolymer to have a narrow compositional distribution as discussed above, each of the isolated fractions will generally have a composition (wt % ethylene content) with a difference of no greater than 20 wt % (relative) or in other embodiments no greater than 10 wt % (relative) from the average wt % ethylene content of the entire second polymer component.

In general, the propylene-based elastomers can be synthesized to have a broad range of molecular weights and/or be characterized by a broad MFR range. For example, the propylene-based elastomers can have a MFR, as measured according to ASTM D-1238, 2.16 kg weight @ 230° C., of at least 0.5 dg/min, in other embodiments at least 1.0 dg/min, and in other embodiments at least 1.5 dg/min. In these or other embodiments, the MFR may be less than 180 dg/min, and in other embodiments less than 150 dg/min.

In one or more embodiments, the propylene-based elastomer can have a weight average molecular weight ($M_w$) of about 5 to about 5,000 kg/mole, in other embodiments a $M_w$ of about 10 to about 1,000 kg/mole, in other embodiments a $M_w$ of about 20 to about 500 kg/mole and in other embodiments a $M_w$ of about 50 to about 400 kg/mole.

In one or more embodiments, the propylene-based elastomer can have a number average molecular weight ($M_n$) of about 2.5 to about 2,500 kg/mole, in other embodiments a $M_n$ of about 5 to about 500 kg/mole, in other embodiments a $M_n$ of about 10 to about 250 kg/mole, and in other embodiments a $M_n$ of about 25 to about 200 kg/mole.

In one or more embodiments, the molecular weight distribution index (MWD=($M_w/M_n$)) of the propylene-based elastomer may be about 1 to about 40, in other embodiments about 1 to about 5, in other embodiments about 1.8 to about 5, and in other embodiments about 1.8 to about 3.

Techniques for determining the molecular weight ($M_n$, $M_w$) and molecular weight distribution (MWD) may be found in U.S. Pat. No. 4,540,753 (Cozewith, Ju and Verstrate) (which is incorporated by reference herein for purposes of U.S. practices), and references cited therein, and in Macromolecules, 1988, volume 21, p 3360 (Verstrate et al.), which is herein incorporated by reference for purposes of U.S. practices, and references cited therein. For example, molecular weight may be determined by size exclusion chromatography (SEC) by using a Waters 150 gel permeation chromatograph equipped with a differential refractive index detector and calibrated using polystyrene standards.

In one or more embodiments, the bimodality of the compositions employed in practicing the present invention derives from forming the composition by blending first and second propylene-based elastomers characterized by distinct MFRs. In particular embodiments, the first propylene-based elastomer composition may have an MFR that is equal to or less than to 50 dg/min, in other embodiments less than 45 dg/min, in other embodiments less than 40 dg/min, in other embodiments less than 35 dg/min, in other embodiments less than 30 dg/min, and in other embodiments less than 25 dg/min, where the MFR is measured by ASTM D-1238, 2.16 kg weight @ 230° C. In these or other embodiments, the first propylene-based elastomer composition may have an MFR that is greater than 0.5 dg/min, in other embodiments greater than 1.0 dg/min, in other embodiments greater than 5.0 dg/min, in other embodiments greater than 10 dg/min, and in other embodiments greater than 15 dg/min.

The second propylene-based elastomer composition may have an MFR that is greater than 50 dg/min, in other embodiments greater than 55 dg/min, in other embodiments greater than 60 dg/min, in other embodiments greater than 65 dg/min, in other embodiments greater than 70 dg/min, and in other embodiments greater than 75 dg/min, where the MFR measured according to ASTM D-1238, 2.16 kg weight @ 230° C. The second propylene-based elastomer composition may have an MFR that is less than 180 dg/min, in other embodiments less than 140 dg/min, in other embodiments less than 120 dg/min, and in other embodiments less than 100 dg/min, and in other embodiments less than 90 dg/min.

The propylene-based elastomers employed in the present invention may be prepared by employing synthetic techniques known in the art for preparing propylene-based elastomers having the foregoing characteristics. Reference can be made to U.S. Pat. Nos. 6,525,157, 6,982,310, 6,992,158, 6,992,159, and 6,992,160. Propylene-based elastomers are commercially available, for example, under the tradename Vistamaxx™ (ExxonMobil)

Propylene-Based Thermoplastic Polymer

Propylene-based thermoplastic resins, which may also be referred to as propylene-based thermoplastic polymers, include those polymers that primarily comprise units deriving from the polymerization of propylene. In certain embodiments, at least 98% of the units of the propylene-based thermoplastic polymer derive from the polymerization of propylene. In some embodiments, these polymers may include homopolymers of propylene.

In certain embodiments, the propylene-based thermoplastic polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof. Specifically included are the reactor, impact, and random copolymers of propylene with ethylene or the higher α-olefins, described above, or with $C_{10}$-$C_{20}$ diolefins.

In one or more embodiments, the propylene-based thermoplastic polymers can have a $T_m$ that is greater than 120° C., in other embodiments greater than 155° C., and in other embodiments greater than 160° C. In these or other embodiments, the propylene-based thermoplastic polymers can have a $T_m$ that is less than 180° C., in other embodiments less than 170° C., and in other embodiments less than 165° C.

In one or more embodiments, the propylene-based thermoplastic polymers may have an $H_f$ that is equal to or greater than 80 J/g, in other embodiments greater than 100 J/g, in other embodiments greater than 125 J/g, and in other embodiments greater than 140 J/g as measured by DSC.

In one or more embodiments, propylene-based thermoplastic polymers may include crystalline and semi-crystalline polymers. In one or more embodiments, these polymers may have a crystallinity of at least 40% by weight, in other embodiments at least 55% by weight, in other embodiments at least 65%, and in other embodiments at least 70% by weight as determined by DSC. Crystallinity may be determined by dividing the heat of fusion of a sample by the heat of fusion of a 100% crystalline polymer, which is assumed to be 189 J/g for isotactic polypropylene.

In general, the propylene-based thermoplastic polymers may be synthesized to have a broad molecular weight range and/or a broad MFR range. For example, the propylene-based thermoplastic polymers can have an MFR of at least 2 dg/min, in other embodiments at least 4 dg/min, in other embodiments at least 6 dg/min, and in other embodiments at least 10 dg/min, where the MFR is measured according to ASTM D-1238, 2.16 kg @ 230° C. In these or other embodiments, the propylene-based thermoplastic polymer can have an MFR of less than 2,000 dg/min, in other embodiments less than 400 dg/min, in other embodiments less than 250 dg/min, in other embodiments less than 100 dg/min, and in other embodiments less than 50 dg/min, where the MFR is measured according to ASTM D-1238, 2.16 kg @ 230° C.

In one or more embodiments, the propylene-based thermoplastic polymers may have an $M_w$ of from about 50 to about 2,000 kg/mole, and in other embodiments from about 100 to about 600 kg/mole. They may also have a $M_n$ of about 25 to about 1,000 kg/mole, and in other embodiments about 50 to about 300 kg/mole, as measured by GPC with polystyrene standards.

In one or more embodiments, the bimodality of the compositions employed in practicing the present invention may derive from forming the composition by introducing and blending first and second propylene-based thermoplastic polymers characterized by distinct MFRs. In one or more embodiments, the first propylene-based thermoplastic polymer may have an MFR equal to or less than 20 dg/min, in other embodiments less than 18 dg/min, in other embodiments less than 15 dg/min, in other embodiments less than 10 dg/min, in other embodiments less than 5 dg/min, and in other embodiments less than 1.0 dg/min, where the MFR is measured according to ASTM D-1238, 2.16 kg @ 230° C. In other embodiments, the first propylene-based thermoplastic polymer may have an MFR that is greater than 0.5 dg/min, and in other embodiments greater than 10 dg/min.

In one or more embodiments, the second propylene-based thermoplastic polymer may have an MFR greater than 20 dg/min, in other embodiments greater than 25, in other embodiments greater than 30 dg/min, in other embodiments greater than 35 dg/min, and in other embodiments greater than 40 dg/min, where the MFR is measured according to ASTM D-1238, 2.16 kg @ 230° C. The second propylene-based thermoplastic polymer may have an MFR that is less than 2,000 dg/min, in other embodiments less than 500 dg/min, in other embodiments less than 250 dg/min, and in other embodiments less than 100 dg/min.

The propylene-based thermoplastic polymers may be synthesized by using an appropriate polymerization technique known in the art, including but not limited to slurry, gas phase, or solution processes, using catalyst systems such as conventional Ziegler-Natta catalysts or other single-site organometallic catalysts like metallocenes or non-metallocenes.

In one embodiment, the propylene-based thermoplastic polymers include a homopolymer of a high-crystallinity isotactic or syndiotactic polypropylene. This polypropylene can have a density of from about 0.85 to about 0.91 g/cc, with the largely isotactic polypropylene having a density of from about 0.90 to about 0.91 g/cc.

Other Additives

The blends of this invention may also comprise other ingredients. For example, the blends of this invention may comprise nucleating agents, which can be present at from about 50 to 4000 ppm, based on the total amount of polymer in the blend composition. Nucleating agents include, for example, sodium benzoate and talc. Also, other nucleating agents may be employed, such as Ziegler-Natta olefin products or other highly crystalline polymers. Nucleating agents include Hyperform, such as HPN-68, Millad additives (e.g., Millad 3988) (Milliken Chemicals, Spartanburg, S.C.), and organophosphates like NA-11 and NA-21 (Amfine Chemicals, Allendale, N.J.).

Further, a variety of additives may be incorporated into the embodiments described above used to make the blends, fibers, and fabrics for various purposes. Other additives include, for example, stabilizers, antioxidants, fillers, and slip aids. Primary and secondary antioxidants include, for example, hindered phenols, hindered amines, and phosphites. Other additives such as dispersing agents (for example, Acrowax C) can also be included. Catalyst deactivators may also be used including, for example, calcium stearate, hydrotalcite, and calcium oxide, and/or other acid neutralizers known in the art.

In one or more embodiments, useful slip aids include those compounds or molecules that are incompatible with the polymeric matrix of the fibers (i.e., the propylene-based elastomers and/or propylene-based thermoplastic resins and/or feel modifiers) and therefore migrate to the surface of the fiber. In one or more embodiments, the slip aids form a monolayer over the surface (or a portion thereof) of the fiber. In these or other embodiments, useful slip aids are characterized by relatively low molecular weight, which can facilitate migration to the surface.

Types of slip aids include fatty acid amides as disclosed in *Handbook of Antiblocking, Release and Slip Additives*, George Wypych, Page 23. Examples of fatty acid amides include behenamide, erucamide, N-(2-hdriethyl) erucamide, Lauramide, N,N'-ethylene-bis-oleamide, N,N'-ethylene bis-steamide, oleamide, oleyl palmitamide, stearyl erucamide, tallow amide, and mixtures thereof.

Other additives include, for example, fire/flame retardants, plasticizers, vulcanizing or curative agents, vulcanizing or curative accelerators, cure retarders, processing aids, and the like. The aforementioned additives may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include antiblocking agents or lubricants.

In yet other embodiments, isoparaffins, polyalphaolefins, polybutenes, or a mixture of two or more thereof may also be added to the compositions of the invention. Polyalphaolefins may include those described in WO 2004/014998, particularly those described at page 17, line 19 to page 19, line 25. These polyalphaolefins may be added in amounts such as about 0.5 to about 40% by weight, in other embodiments from about 1 to about 20% weight, and in other embodiments from about 2 to about 10% by weight.

Preparing the Composition

The compositions employed to make the fibers and/or fabrics of one or more embodiments of this invention may be prepared by employing several techniques. In one or more embodiments, the compositions may be prepared by combining a first propylene-based polymer blend characterized by an MFR equal to or less than 50 dg/min with a second propylene-based polymer blend characterized by an MFR of greater than 50 dg/min.

In one or more embodiments, the MFR of the first propylene-based polymer blend may be less than 45 dg/min, in other embodiments less than 40 dg/min, in other embodiments less than 30 dg/min, in other embodiments less than 25 dg/min, and in other embodiments from about 1 to about 45 dg/min (ASTM D-1238, 2.16 kg @ 230° C.). In these or other embodiments, the MFR of the second propylene-based polymer blend may be greater than 55 dg/min, in other embodiments greater than 60 dg/min, in other embodiments greater than 65 dg/min, in other embodiments greater than 70 dg/min, in other embodiments greater than 75 dg/min, and in other embodiments from about 55 to about 95 dg/min (ASTM D-1238, 2.16 kg @ 230° C.).

In one or more embodiments, the first propylene-based polymer blend may be formed by introducing a propylene-based elastomer (which may be referred to as a first propylene-based elastomer) with a propylene-based thermoplastic (which may be referred to as a first propylene-based thermoplastic). In one or more embodiments, the first propylene-based polymer blend may include at least 60 wt %, in other embodiments at least 70 wt %, in other embodiments at least 80 wt %, and in other embodiments from about 83 wt % to about 90 wt % of the first propylene-based elastomer, based upon the total weight of the first propylene-based polymer blend, with the balance including the first propylene-based thermoplastic polymer. In these or other embodiments, the first propylene-based polymer blend may include at least 5 wt %, in other embodiments at least 7 wt %, in other embodiments at least 10 wt %, and in other embodiments from about 10 to about 17 wt % of the first propylene-based thermoplastic based upon the total weight of the first propylene-based polymer blend, with the balance including the first propylene-based elastomer.

In one or more embodiments, the second propylene-based polymer blend may be formed by introducing a propylene-based elastomer (which may be referred to as a second propylene-based elastomer) with a propylene-based thermoplastic (which may be referred to as a second propylene-based thermoplastic). In one or more embodiments, the second propylene-based polymer blend may include at least 60 wt %, in other embodiments at least 70 wt %, in other embodiments at least 80 wt %, and in other embodiments from about 83 wt % to about 90 wt % of the second propylene-based elastomer, based upon the total weight of the second propylene-based polymer blend, with the balance including the second propylene-based thermoplastic polymer. In these or other embodiments, the second propylene-based polymer blend may include at least 5 wt %, in other embodiments at least 7 wt %, in other embodiments at least 10 wt %, and in other embodiments from about 10 to about 17 wt % of the second propylene-based thermoplastic based upon the total weight of the second propylene-based polymer blend, with the balance including the second propylene-based elastomer.

In one or more embodiments, the MFR of the second propylene-based polymer blend may be increased by vis breaking. In one or more embodiments, vis breaking includes treating the blend with peroxide in the melt. In other embodiments, once the second propylene-based polymer blend undergoes vis breaking, the first and second propylene-based polymer blends can be introduced and mixed. In view of the foregoing, it should be appreciated that the MFR of the first and the second propylene-based polymer blends may both be below 50 prior to vis breaking. In certain embodiments, the first and second propylene-based polymer blends are identical prior to vis breaking.

In other embodiments, the composition may be prepared by combining at least three of the following (a) a propylene-based elastomer characterized by a MFR greater than 50 dg/min; (b) a propylene-based elastomer characterized by a MFR equal to or less than 50 dg/min; (c) a propylene-based thermoplastic polymer characterized by a MFR equal to or less than 20 dg/min; and (d) a propylene-based thermoplastic polymer characterized by a MFR greater than 20 dg/min. The individual propylene-based elastomers or propylene-based thermoplastic polymers may be synthesized to the specified MFR and then blended. In other embodiments, the MFR can be adjusted to a desired specification by vis breaking, and then the individual propylene-based elastomer or propylene-based thermoplastic polymers can be introduced and blended.

The propylene-based elastomer and propylene-based thermoplastic resin may be introduced and blended by any procedure that causes an intimate admixture of the components. Likewise, the first and second propylene-based polymer blends may be introduced and blended in a similar fashion. For example, they may be blended in a tumbler, static mixer, batch mixer, extruder, or a combination thereof. In these or other embodiments, the mixing may take place as part of a processing method used to fabricate the fibers. In other embodiments, an internal mixer may be employed for melt blending; for example, the components can be blended at 180° C. to 240° C. in a Brabender Plastograph for 1 to 20 minutes. In yet other embodiments, the polymers can be blended in a Banbury internal mixer above the flux temperature of the polymers (e.g., 180° C. for about 5 min.). In yet other embodiments, a continuous mixer may be employed including those well known in the art such as twin-screw mixing extruders, static mixers for mixing molten polymer streams of low viscosity, impingement mixers, and the like.

The addition or introduction of the additional ingredients to the blend of the propylene-based elastomer and propylene-based thermoplastic resin may take place by using similar methods employed to form the initial blend. In particular embodiments, the additional ingredients are added as part of the fiber forming process.

Amounts

In those embodiments where the composition is prepared by combining a first propylene-based polymer blend with a second propylene-based polymer blend, the amount of the first propylene-based polymer blend (i.e., blend with MFR equal to or less than 50 dg/min) introduced with the second propylene-based polymer blend (i.e., blend with MFR greater than 50 dg/min) may be at least 10 percent by weight, in other embodiments at least 20 percent by weight, in other embodiments at least 25 percent by weight, and in other embodiments at least 35 percent by weight, based on the total weight of the first and second propylene-based polymer blends.

In these or other embodiments, the amount of the second propylene-based polymer blend (MFR greater than 50 dg/min) introduced with the first propylene-based polymer blend (MFR equal to or less than 50 dg/min) may be at least 60 percent by weight, in other embodiments at least 70 percent by weight, in other embodiments at least 75 percent by weight, and in other embodiments at least 85 percent by weight, based on the total weight of the first and second propylene-based polymer blends.

In these or other embodiments, the compositions may be prepared by introducing from about 10 to about 40 percent by weight, or in other embodiments from about 15 to about 35 percent by weight of the first propylene-based polymer blend (MFR<50) with from about 90 to about 60 percent by weight, or in other embodiments from about 85 to about 65 percent by weight of the second propylene-based polymer blend (MFR<50) based on the total weight of the first and second propylene-based polymer blend.

In those embodiments where the composition is prepared by combining at least three of (a) a propylene-based elastomer characterized by a MFR greater than 50 dg/min; (b) a propylene-based elastomer characterized by a MFR equal to or less than 50 dg/min; (c) a propylene-based thermoplastic polymer characterized by a MFR equal to or less than 20 dg/min; and (d) a propylene-based thermoplastic polymer characterized by a MFR greater than 20 dg/min, the composition may be prepared by introducing at least 55 wt %, in other embodiments at least 65 wt %, in other embodiments at least 75 wt %, and in other embodiments from about 60 to about 90 wt %, of a propylene-based elastomer with a propylene-based thermoplastic polymer, where the propylene-based elastomer may include (a), (b), or (a) and (b), and where the foregoing amounts are based on the total weight of (a), (b), (c), and (d). In these or other embodiments, the composition may be prepared by introducing at least 10 wt %, in other embodiments at least 15 wt %, in other embodiments at least 20 wt %, and in other embodiments from about 10 to about 40 wt % of a propylene-based thermoplastic polymer with the propylene-based elastomer, where the propylene-based thermoplastic may include (c), (d), (c) and (d), and where the amounts are based on the total weight of (a), (b), (c), and (d).

Fiber & Fabric Formation

The formation of non-woven fabrics from the foregoing compositions may include manufacture of fibers by extrusion followed by weaving or bonding. The extrusion process may be accompanied by mechanical or aerodynamic drawing of the fibers. The fiber and fabrics of the present invention may be manufactured by any technique and/or equipment known in the art, many of which are well known. For example, spunbond non-woven fabrics may be produced by spunbond non-woven production lines produced by Reifenhauser GmbH & Co., of Troisdorf, Germany. The Reifenhasuer system utilizes a slot drawing technique as described in U.S. Pat. No. 4,820,142.

Conventional Fine Denier Fibers

In one or more embodiments, fibers may be produced by continuous filament, bulked continuous filament, or staple fiber-formation techniques. For example, the polymer melt may be extruded through the holes in a die (spinneret), which may, for example, be between 0.3 mm and 0.8 mm in diameter. Low melt viscosity of the polymer may be achieved through the use of high melt temperature (e.g., 230° C. to 280° C.) and high melt flow rates (e.g., 15 g/10 min to 40 g/10 min) of the polymers used. A relatively large extruder may be equipped with a manifold to distribute a high output of molten polymer to a bank of from about eight to about twenty spinnerets. Each spinhead may be equipped with a separate gear pump to regulate output through that spinhead; a filter pack, supported by a "breaker plate;" and the spinneret plate within the head. The number of holes in the spinneret plate determines the number of filaments in a yarn and varies considerably with the different yarn constructions, but it is typically in the range of 50 to 250. The holes can be grouped into round, annular, or rectangular patterns to assist in good distribution of the quench air flow.

Continuous Filament

Continuous filament yarns can range from 40 denier to 2,000 denier (denier=number of grams/9000 meters). Filaments can range from 1 to 20 denier per filament (dpf), although larger ranges are contemplated. Spinning speeds may include 800 m/min to 1500 m/min (2500 ft/min to 5000 ft/min). An exemplary method would proceed as follows. The filaments are drawn at draw ratios of 3:1 or more (one- or two-stage draw) and wound onto a package. Two-stage drawing allows higher draw ratios to be achieved. Winding speeds are 2,000 m/min to 3,500 m/min (6,600 ft/min to 11,500 ft/min). Spinning speeds in excess of 900 m/min (3000 ft/min) may require a narrow molecular weight distribution to get the best spinnability with finer filaments, such as, for example, resins with a minimum MFR of 5 and a narrow molecular weight distribution, i.e. with a polydispersity index (PI) under 2.8. In slower spinning processes, or in heavier denier filaments, a 16-MFR reactor grade product may be more appropriate.

Partially Oriented Yarn (POY)

Partially oriented yarn (POY) is the fiber produced directly from fiber spinning without solid state drawing (as continuous filament mentioned above). The orientation of the molecules in the fiber is done only in the melt state just after the molten polymer leaves the spinneret. Once the fiber is solidified, no drawing of the fiber takes place and the fiber is wound onto a package. The POY yarn (as opposed to fully oriented yarn, or FOY, which has gone through solid state orientation and has a higher tensile strength and lower elongation) tends to have a higher elongation and lower tenacity.

Bulked Continuous Filament

Bulked continuous filament fabrication processes fall into two basic types, one-step and two step. For example, in a two-step process, an undrawn yarn is spun at less than 1,000 m/min (3,300 ft/min), usually 750 m/min, and placed on a package. The yarn is drawn (usually in two stages) and "bulked" on a machine called a texturizer. Winding and drawing speeds are limited by the bulking or texturizing device, typically to 2,500 m/min (8,200 ft/min) or less. As in the two-step CF process, secondary crystallization requires prompt draw texturizing. Common processes include one-step spin/draw/text (SDT) processes. This process may provide better economics, efficiency and quality than the two-step process. They are similar to the one-step CF process, except that the bulking device is in-line. Bulk or texture may change yarn appearance, separating filaments and adding enough gentle bends and folds to make the yarn appear fatter (bulkier).

Staple Fiber

Fiber fabrication processes include two processes: traditional and compact spinning. The traditional process typically involves two steps: i) producing, applying finish, and winding followed by ii) drawing, a secondary finish application, crimping, and cutting into staple. Filaments can range, for example, from 1.5 dpf to >70 dpf, depending on the application. Staple length can be as short as 7 mm or as long as 200 mm (0.25 in. to 8 in.) to suit the application. For many applications, the fibers are crimped. Crimping is accomplished by over-feeding the tow into a steam-heated stuffer box with a pair of nip rolls. The over-feed folds the tow in the box, forming bends or crimps in the filaments. These bends may be heat-set by steam injected into the box. The MW, MWD, and isotactic content of the resin can affect crimp stability, amplitude, and ease of crimping.

Melt Blown Fabrics

Melt blown fabrics may refer to webs of fine filaments having fiber diameter in the range of 20 to 0.1 microns. Fiber diameters of melt blown fibers may be, in some embodiments, in the range of 1 to 10 microns, or in other embodiments from 1 to about 5 microns. The non-woven webs formed by these fine fiber diameters have very small pore sizes and therefore may have excellent barrier properties. For example, in the melt blown process, the extruder melts the polymer and delivers it to a metering melt pump. The melt pump delivers the molten polymer at a steady output rate to the special melt blowing die. As the molten polymer exits the die, it is contacted by high temperature, high velocity air (called process or primary air). This air rapidly draws and, in combination with the quench air, solidifies the filaments. The entire fiber forming process typically takes place within several inches of the die. Die design can be important to producing a quality product efficiently. The fabric is formed by blowing the filaments directly onto a porous forming belt, typically 200 mm to 400 mm (8 in. to 15 in.) from the spinnerets. A larger forming distance may be used for heavier basis weight, higher loft product. Melt blowing may require very high melt flow rate resins such as those greater than 200 g/10 min, to obtain the finest possible fibers, although resin MFR as low as 20 g/10 min can be used at a higher processing temperature in other embodiments.

Spunbonded Fabric

Spunbond or spunbonded fibers include fibers produced, for example, by the extrusion of molten polymer from either a large spinneret having several thousand holes or with banks of smaller spinnerets, containing for example as few as 40 holes. After exiting the spinneret, the molten fibers are quenched by a cross-flow air quench system, then pulled away from the spinneret and attenuated (drawn) by high speed air. There are generally two methods of air attenuation, both of which use the venturi effect. The first draws the filament using an aspirator slot (slot draw), which may run the width of the spinneret or the width of the machine. The second method draws the filaments through a nozzle or aspirator gun. Filaments formed in this manner may be collected on a screen ("wire") or porous forming belt to form the web. The web can then be passed through compression rolls and then between heated calendar rolls where the raised lands on one roll bond the web at points covering, for example, 10% to 40% of its area to form a non-woven fabric. In another embodiment, welding of the fibers can also be effected using convection or radiative heat. In yet another embodiment, fiber welding can be effected through friction by using hydro entangling or needle punch methods.

Annealing may be done after the formation of fiber in continuous filament or fabrication of a non-woven material from the fibers. Annealing may partially relieve the internal stress in the stretched fiber and restore the elastic recovery properties of the blend in the fiber. Annealing has been shown to lead to significant changes in the internal organization of the crystalline structure and the relative ordering of the amorphous and semicrystalline phases. This may lead to recovery of the elastic properties. For example, annealing the fiber at a temperature of at least 40° C., above room temperature (but slightly below the crystalline melting point of the blend), may be adequate for the restoration of the elastic properties in the fiber.

Thermal annealing of the fibers can be conducted by maintaining the fibers (or fabrics made from the fibers) at temperatures, for example, between room temperature up to 160° C., or alternatively to a maximum of 130° C. for a period between a few seconds to less than 1 hour. A typical annealing period is 1 to 5 minutes at about 100° C. The annealing time and temperature can be adjusted based upon the composition employed. In other embodiments, the annealing temperature ranges from 60° C. to 130° C. In another embodiment, the temperature is about 100° C.

In certain embodiments, for example conventional continuous fiber spinning, annealing can be done by passing the fiber through a heated roll (godet) without the application of conventional annealing techniques. Annealing may desirably be accomplished under very low fiber tension to allow shrinking of the fiber in order to impart elasticity to the fiber. In non-woven processes, the web usually passes through a calender to point bond (consolidate) the web. The passage of the unconsolidated non-woven web through a heated calender at relatively high temperature may be sufficient to anneal the fiber and increase the elasticity of the non-woven web. Similar to fiber annealing, the non-woven web may desirably be formed under low tension to allow for shrinkage of the web in both machine direction (MD) and cross direction (CD) to enhance the elasticity of the non-woven web. In other embodiments, the bonding calender roll temperature ranges from 100° C. to 130° C. In another embodiment, the temperature is about 100° C. The annealing temperature can be adjusted for any particular blend.

INDUSTRIAL APPLICABILITY

The fibers and non-woven fabrics of the present invention may be employed in several applications. In one or more embodiments, they may be advantageously employed in diapers and/or similar personal hygiene articles, for example in such applications as diaper tabs, side panels, leg cuffs, top sheet, back sheet, tapes, feminine hygiene articles, swim pants, infant pull up pants, incontinence wear components, and bandages. In particular, they can be employed as the dynamic or stretchable components of these articles such as, but not limited to, the elastic fastening bands. In other embodiments, the fibers and non-woven fabrics may be fabricated into other protective garments or covers such as medical gowns or aprons, surgical drapes, sterilization wraps, wipes, bedding, or similar disposable garments and covers. These materials may also find applications in protective covers, home furnishing such as bedding, carpet antiskid padding, wall coverings, floor coverings, window shades, scrims, and any other application in which traditional fabrics have been used previously.

In other embodiments, the fibers and fabrics of the present of the present invention can be employed in the manufacture of filtration media (gas and liquid). For example, particular applications include use in functionalized resins where the non-woven fabric can be electrostatically charged to form an electret.

Further, the fibers and fabrics of the present invention may be employed in any of the structures and other end-use applications, or in conjunction with any of the additives and other compositions described in U.S. patent application Ser. Nos. 11/698,359; 11/655,399; and 11/698,630, which are incorporated herein by reference in their entirety to the extent permitted.

Certain specific embodiments of the present invention include those described in the following paragraphs preceding the examples:

A non-woven fabric made from a composition prepared by combining a first propylene-based polymer blend, where the first blend is prepared by combining a propylene-based elastomer with a propylene-based thermoplastic resin and where the first blend has an MFR (ASTM D-1238 2.16 kg @ 230° C.) equal to or less than 50 dg/min, with a second propylene-based polymer blend, where the second blend is prepared by combining a propylene-based elastomer with a propylene-based thermoplastic resin and where the second blend has an MFR (ASTM D-1238 2.16 kg @ 230° C.) greater than 50 dg/min. In each blend, the propylene-based elastomers comprise from about 5% to 35% by weight units derived from ethylene or non-propylene alpha-olefin and have a heat of fusion, as determined by DSC, of less than 80 J/g, and the propylene-based thermoplastic polymer has a heat of fusion, as determined by DSC, equal to or greater than 80 J/g.

The embodiments of the preceding paragraph, where the first propylene-based polymer blend has an MFR (ASTM D-1238 2.16 kg @ 230° C.) of less than 45 dg/min.

The embodiments of any of the preceding paragraphs, where the first propylene-based polymer blend has an MFR (ASTM D-1238 2.16 kg @ 230° C.) of less than 35 dg/min.

The embodiments of any of the preceding paragraphs, where the second propylene-based polymer blend has an MFR (ASTM D-1238 2.16 kg @ 230° C.) of greater than 55 dg/min.

The embodiments of any of the preceding paragraphs, where the second propylene-based polymer blend has an MFR (ASTM D-1238 2.16 kg @ 230° C.) of greater than 65 dg/min.

The embodiments of any of the preceding paragraphs, where the propylene-based elastomer has a melt temperature of less than 120° C., and where the propylene-based thermoplastic polymer has a melt temperature of greater than 120° C.

The embodiments of any of the preceding paragraphs, where the propylene-based elastomer has a melt temperature of less than 100° C., and where the propylene-based thermoplastic polymer has a melt temperature of greater than 155° C.

The embodiments of any of the preceding paragraphs, where the composition is prepared by introducing at least 10 parts by weight of the first propylene-based polymer blend with the second propylene-based polymer blend, based on 100 parts by weight of the first and second propylene-based polymer blends.

The embodiments of any of the preceding paragraphs, where the composition is prepared by introducing at least 75 parts by weight of the second propylene-based polymer blend with the first propylene-based polymer blend, based on 100 parts by weight of the first and second propylene-based polymer blends.

The embodiments of any of the preceding paragraphs, where the composition is prepared by introducing at least 25 parts by weight of the first propylene-based polymer blend with the second propylene-based polymer blend, based on 100 parts by weight of the first and second propylene-based polymer blends.

The embodiments of any of the preceding paragraphs, where the composition is prepared by introducing at least 60 parts by weight of the first propylene-based polymer blend with the second propylene-based polymer blend, based on 100 parts by weight of the first and second propylene-based polymer blends.

The embodiments of any of the preceding paragraphs, where from about 10 to about 40 parts by weight of the first propylene-based polymer blend is introduced with about 90 to about 60 parts by weight of the second propylene-based polymer blend.

The embodiments of any of the preceding paragraphs, where the first propylene-based polymer blend includes at least 60% by weight of the (ai) first propylene-based elastomer and at least 10% by weight of the (aii) first propylene-based thermoplastic.

The embodiments of any of the preceding paragraphs, where the first propylene-based polymer blend includes at least 70% by weight of the first propylene-based elastomer and at least 5% by weight of the first propylene-based thermoplastic.

The embodiments of any of the preceding paragraphs, where the second propylene-based polymer blend includes at least 60% by weight of the second propylene-based elastomer and at least 10% by weight of the second propylene-based thermoplastic.

The embodiments of any of the preceding paragraphs, where the second propylene-based polymer blend includes at least 70% by weight of the second propylene-based elastomer and at least 5% by weight of the second propylene-based thermoplastic.

The embodiments of any of the preceding paragraphs, where the composition is prepared by introducing a slip aid with the first propylene-based polymer blend, the second propylene-based polymer blend or the combination of the first and second propylene-based polymer blend.

A non-woven fabric made from a composition prepared by introducing at least three of the following: (a) a propylene-based elastomer having an MFR (ASTM D-1238 2.16 kg @ 230° C.) greater than 50; (b) a propylene-based elastomer having an MFR (ASTM D-1238 2.16 kg @ 230° C.) equal to or less than 50; (c) a propylene-based thermoplastic polymer having an MFR (ASTM D-1238 2.16 kg @ 230° C.) equal to or less than 20; and (d) a propylene-based thermoplastic polymer having an MFR (ASTM D-1238 2.16 kg @ 230° C.) greater than 20, where the propylene-based elastomers comprise from about 5% to about 35% by weight units derived from ethylene or non-propylene alpha-olefin and have a heat of fusion, as determined by DSC, of less than 80 J/g, and where the propylene-based thermoplastic polymers have a heat of fusion, as determined by DSC, equal to or greater than 80 J/g.

A method for preparing a non-woven fabric, the method comprising fabricating a non-woven fabric from a composition prepared by combining a first propylene-based polymer blend, where the first polymer blend is prepared by combining a propylene-based elastomer with a propylene-based thermoplastic resin and where the first blend has an MFR (ASTM D-1238 2.16 kg @ 230° C.) equal to or less than 50, with a second propylene-based polymer blend, where the second polymer blend is prepared by combining a propylene-based elastomer with a propylene-based thermoplastic resin and where the second blend has an MFR (ASTM D-1238 2.16 kg @ 230° C.) greater than 50, where the propylene-based elastomers are comprise from about 5% to 35% by weight units derived from ethylene or non-propylene alpha-olefin and have a heat of fusion, as determined by DSC, of less than 80 J/g, and where the propylene-based thermoplastic polymer has a heat of fusion, as determined by DSC, equal to or greater than 80 J/g.

A non-woven fabric made from a composition comprising a propylene-based elastomer and a propylene-based thermoplastic polymer, where the propylene-based elastomer comprises from about 5% to about 35% by weight units derived from ethylene or non-propylene alpha-olefin and has a heat of fusion, as determined by DSC, of less than 80 J/g, and where the propylene-based thermoplastic polymer has a heat of fusion, as determined by DSC, equal to or greater than 80 J/g, and where at least one of the propylene-based elastomer and the propylene-based thermoplastic polymer exhibit a bimodal molecular weight distribution.

In order to demonstrate the practice of the present invention, the following examples have been prepared and tested. The examples should not, however, be viewed as limiting the scope of the invention. The claims will serve to define the invention, and any modifications within the scope of the claims that would be recognized by persons skilled in the art are also considered to be part of the invention.

EXAMPLES

Example I

Propylene-based elastomers and polypropylene-based thermoplastic resins were melt blended to form various blends. Two of the blends, while in the melt, were treated with peroxide to adjust the MFR of the blend to about 80 dg/min (ASTM D-1238, 2.16 kg load @ 230° C.).

Four blends were produced, and the characteristics thereof are provided in Table 1.

TABLE I

| Blend | Weight % Elastomer | Weight % Thermoplastic | Vis Breaking | MFR (g/10 min) |
|---|---|---|---|---|
| Blend I | 90 | 10 | No | 20 |
| Blend II | 85 | 15 | No | 20 |
| Blend III | 90 | 10 | Yes | 80 |
| Blend IV | 85 | 15 | Yes | 80 |

The propylene-based elastomer comprised approximately 15 weight percent ethylene and had an MFR of 20 dg/min (ASTM D-1238, 2.16 kg load @ 230° C.), a density of 0.863 g/cm$^3$, a $T_m$ of 48° C. after annealing for 4 days, an $H_f$ of 19 J/g, a $M_w$ of 134 kg/mol, an $M_n$ of 72 dg/mol, an MWD of 1.9, and included propylene crystallinity. The propylene-based elastomer was prepared by using solution metallocene polymerization according to known techniques. The propylene-based thermoplastic polymer had a $T_m$ of 166° C., an $H_f$ of 98 J/g (in the first heat cycle), an MFR of 36 dg/min (ASTM D-1238, 2.16 kg load (230° C.), and was obtained under the tradename PP3155™ (ExxonMobil).

The following samples represent spunbond fabrics that were produced from the blends, or mixtures thereof, by using a Reicofil™ 1.5 spunbond beam line (Reifenhauser GmbH, Troisdorf, Germany).

The spin beam had approximately a 1 meter wide rectangular spinneret having approximately 4000 holes. Each hole had a diameter of 0.6 mm. The spunbond system included an extruder that delivered homogenized molten polymer to a melt pump, which delivered the molten polymer to the spin beam.

The extruder temperature profile was adjusted to provide a melt temperature of 209° C. The output rate was generally in the range from about 0.2 gram/hole/min (ghm), achieved by setting the spin pump at 9 rpm. The extruder screw speed was about 55 rpm.

The molten polymer thread exiting the spinneret was quenched and drawn down into fine fibers by cold air. The quenched and highly drawn fibers were deposited on a moving porous web to form a mat of non-woven web. The unbonded web was passed through a calender roll heated to approximately 88° C. As the web was passed through the nip of the calender, the fiber was annealed (i.e., thermally bonded). The calendar roll pressure was maintained at less than 50 dN/m.

Table II shows the composition of the blends used to make various samples, as well as the spunbond process conditions, and tensile and elastomeric properties obtained from testing the resulting fabrics. The draw force is represented by the quench blower r.p.m., and the maximum r.p.m. of the quench blower is set forth in Table II. It should be appreciated that bimodal propylene-based polymer blends, which include Samples 1-5, were produced where blends of different molecular weight (as shown by MFR) were combined (e.g., Blend I combined with Blend III). Those samples that are comparative are labeled with the letter "C" (i.e., C1).

TABLE II

| | Sample | | | | | | | | |
|---|---|---|---|---|---|---|---|---|---|
| | C1 | C2 | C3 | C4 | 1 | 2 | 3 | 4 | 5 |
| Ingredients (% by weight) | | | | | | | | | |
| Blend I (20 MFR) | — | — | — | — | — | — | — | — | 20 |
| Blend II (20 MFR) | — | — | — | — | 20 | 40 | 20 | 40 | — |
| Blend III (80 MFR) | — | — | 100 | 100 | — | — | 13 | — | 80 |
| Blend IV (80 MFR) | 100 | 100 | — | — | 80 | 60 | 80 | 60 | — |
| Fiber Production Parameters | | | | | | | | | |
| Basis Weight (gsm) | 53 | 24 | 23 | 70 | 55 | 52 | 24 | 21 | 21 |
| Output (ghm) | 0.2 | 0.2 | 0.2 | 0.2 | 0.2 | 0.2 | 0.2 | 0.2 | 0.2 |
| Diameter (microns) | 17.7 | 17.7 | 21.9 | 20.5 | 19.34 | 20.2 | 19.4 | 20.2 | 22.2 |
| Quench Blower (rpm) | 2510 | 2003 | 2003 | 1353 | 2520 | 2410 | 1962 | 1911 | 1962 |
| Suction Blower (rpm) | 2096 | 1589 | 1677 | 1670 | 2100 | 1996 | 1548 | 1411 | 1532 |
| Fiber Tensile Properties | | | | | | | | | |
| Machine Direction Tensile | | | | | | | | | |
| Peak Load (gm/cm) | 719 | 213 | 115 | 743 | 555 | 557 | 138 | 134 | 111 |
| Peak Elongation (%) | 151 | 134 | 196 | 503 | 180 | 150 | 163 | 187 | 178 |
| Cross Direction Tensile | | | | | | | | | |
| Peak Load (gm/cm) | 374 | 122 | 70 | 187 | 292 | 331 | 75 | 79 | 59 |
| Peak Elongation (%) | 208 | 180 | 267 | 220 | 265 | 208 | 199 | 215 | 214 |

TABLE II-continued

| | Sample | | | | | | | | |
|---|---|---|---|---|---|---|---|---|---|
| | C1 | C2 | C3 | C4 | 1 | 2 | 3 | 4 | 5 |
| Ingredients (% by weight) | | | | | | | | | |
| Blend I (20 MFR) | — | — | — | — | — | — | — | — | 20 |
| Blend II (20 MFR) | — | — | — | — | 20 | 40 | 20 | 40 | — |
| Blend III (80 MFR) | — | — | 100 | 100 | — | — | — | — | 80 |
| Blend IV (80 MFR) | 100 | 100 | — | — | 80 | 60 | 80 | 60 | — |
| Fiber Elastomeric Properties | | | | | | | | | |
| Machine Direction | | | | | | | | | |
| Permanent Set (%) | 26 | 26 | 21 | — | 21 | 19 | 16 | 20 | 16 |
| Permanent Set Pre-Stretch (%) | 23 | 19 | 15 | — | 19 | 17 | 13 | 16 | |
| Load Loss (%) | 93 | 93 | 84 | — | 88 | 88 | 86 | 88 | 84 |
| Load Loss Pre-Stretch (%) | 85 | 83 | 68 | — | 77 | 76 | 69 | 73 | 63 |
| Cross Direction | | | | | | | | | |
| Permanent Set (%) | 25 | 24 | 15 | — | 20 | 18 | 16 | 20 | 13 |
| Permanent Set Pre-Stretch (%) | 21 | 21 | 11 | — | 17 | 15 | 14 | 17 | 10 |
| Load Loss (%) | 93 | 93 | 82 | — | 88 | 86 | 84 | 86 | 78 |
| Load Loss Pre-Stretch (%) | 67 | 65 | 80 | — | 59 | 61 | 55 | 57 | 58 |

The fabrics were tested for tensile and elastic properties using a 25.4 mm width specimen. At least three samples were tested for each composition in both the machine direction (MD) and the cross direction (CD). The average values from testing of multiple specimens were used in the analysis and representation of the test data. For elastic property measurements, the samples were extended to 100% strain and returned to zero load without any hold time. This corresponds to the first cycle tests. The samples were stretched for the second time (second cycle) to 100% extension and retuned to zero load with no hold. Both permanent set and load loss were measured in each cycle.

The tensile properties of the fabric tested are in both MD and CD direction. The tensile values correspond to peak load and the corresponding peak extension. The tensile load is calculated by dividing the peak load by the width of the sample, and is expressed in gm/cm. As seen in Table II, the addition of lower MFR blend in Samples 1-5 improves fabric elongation over the control. The tensile load drops with higher elongation, but is still considered adequate for the end use application. Also, the addition of the lower MFR blend reduces permanent set and load loss both in first and second cycle testing.

Various modifications and alterations that do not depart from the scope and spirit of this invention will become apparent to those skilled in the art. This invention is not to be limited to the illustrative embodiments set forth herein.

What is claimed is:

1. A non-woven fabric made from a composition prepared by combining:
   (a) from 10 to 40 percent by weight, based on the weight of the total composition, of a first propylene-based polymer blend prepared by combining (i) 90 to 70 wt %, by weight of the first propylene-based polymer blend, of a first propylene-based elastomer having an $M_w/M_n$ of 1.8 to 5 with (ii) at least 5 to about 17 wt %, by weight of the first propylene-based polymer blend, of a first propylene-based thermoplastic resin, where said first blend has an MFR (ASTM D-1238 2.1.6 kg @ 230° C.) equal to or less than 40 dg/min; with
   (b) from 90 to 60 percent by weight, based on the weight of the total composition, of a second propylene-based polymer blend prepared by combining (i) 90 to 70 wt %, by weight of the second propylene-based polymer blend, of a second propylene-based elastomer having an $M_w/M_n$ of 1.8 to 5 with (ii) at least 5 to about 17 wt %, by weight of the second propylene-based polymer blend, of a second propylene-based thermoplastic resin, where the second propylene-based polymer blend has been vis-broken to an MFR (ASTM D-1238 2.16 kg @ 230° C.) greater than 60 dg/min;
   where the propylene-based elastomers comprise from about 5% to 35% by weight units derived from ethylene or non-propylene alpha-olefin, the propylene-based elastomer possessing a heat of fusion, as determined by DSC, of less than 80 J/g, and where the propylene-based thermoplastic resins have a heat of fusion, as determined by DSC, equal to or greater than 80 J/g, and wherein the propylene-based thermoplastic resin has a $T_m$ that is greater than 120° C. and an MFR from 10 to 50 dg/min (ASTM D-1238 2.16 kg @ 230° C.); and
   wherein the first and second propylene-based polymer blends form a composition that has a bimodal molecular weight distribution.

2. The non-woven fabric of claim 1, where the first propylene-based polymer blend has an MFR (ASTM D-1238 2.16 kg @ 230° C.) of less than 35 dg/min.

3. The non-woven fabric of claim 1, where the second propylene-based polymer blend has an MFR (ASTM D-1238 2.16 kg @ 230° C.) of greater than 65 dg/min.

4. The non-woven fabric of claim 1, where the propylene-based elastomers have a melt temperature of less than 120° C.

5. The non-woven fabric of claim 1, where the propylene-based elastomers have a melt temperature of less than 100° C., and where the propylene-based thermoplastic resins have a melt temperature of greater than 155° C.

6. The non-woven fabric of claim 1, where the composition is prepared by combining at least 10 parts by weight of the first propylene-based polymer blend with the second propylene-based polymer blend, based on 100 parts by weight of the first and second propylene-based polymer blends.

7. The non-woven fabric of claim 6, where the composition is prepared by combining at least 75 parts by weight of the second propylene-based polymer blend with the first propylene-based polymer blend, based on 100 parts by weight of the first and second propylene-based polymer blends.

8. The non-woven fabric of claim 1, where the composition further comprises a slip aid in combination with the first propylene-based polymer blend, the second propylene-based polymer blend, or the combination of the first and second propylene-based polymer blends.

* * * * *